United States Patent [19]
Richards et al.

[11] 3,837,810
[45] Sept. 24, 1974

[54] COMPOSTER

[76] Inventors: Albert Z. Richards, 2022 S. 1635, E., Salt Lake City, Utah 84103; Lynn S. Madsen, 2747 Sherwood Dr., Salt Lake City, Utah 84108

[22] Filed: Aug. 9, 1972

[21] Appl. No.: 279,094

[52] U.S. Cl............... 23/259.1, 71/9, 98/64, 259/81, 261/119 R
[51] Int. Cl. ................................ C05f 9/02
[58] Field of Search........... 23/259.1, 286; 71/6–9, 11; 261/1, 119; 239/6, 8, 34; 98/30, 61, 62, 63–65; 195/131; 259/57, 81

[56] References Cited
UNITED STATES PATENTS

| | | | |
|---|---|---|---|
| 183,498 | 10/1876 | Hay et al. ........................... | 98/65 |
| 254,360 | 2/1882 | Moore ................................ | 98/65 |
| 257,570 | 5/1882 | Gifford............................... | 259/81 R |
| 724,045 | 3/1903 | Rogers............................... | 98/30 |
| 1,104,904 | 7/1914 | Keto .................................. | 259/57 |
| 2,241,734 | 5/1941 | Petersen ............................ | 71/9 |
| 3,041,148 | 6/1962 | Ballantyne et al................ | 23/259.1 |
| 3,245,759 | 4/1966 | Eweson............................. | 23/259.1 |
| 3,248,175 | 4/1966 | Emmet.............................. | 23/259.1 |
| 3,676,074 | 6/1972 | Shibayama et al................ | 23/259.1 |

*Primary Examiner*—Morris O. Wolk
*Assistant Examiner*—Roger F. Phillips
*Attorney, Agent, or Firm*—Richard F. Bojanowski

[57] ABSTRACT

A rectangular or square container, made of a heat insulating material such as wood, for converting organic wastes into compost is mounted for rotation about a supported perforated pipe extending axially through the container. A water-holding manifold is connected via a conduit to the perforated pipe. Water vapor is carried from the manifold by means of air which is introduced into the manifold through a vertical, upstanding pipe. The wet air passes through the perforated pipe and into the container, providing adequate moisture and air for the composting operation. A mechanism is also provided to selectively rotate the container and to hold it at a pre-selected angular position.

5 Claims, 5 Drawing Figures

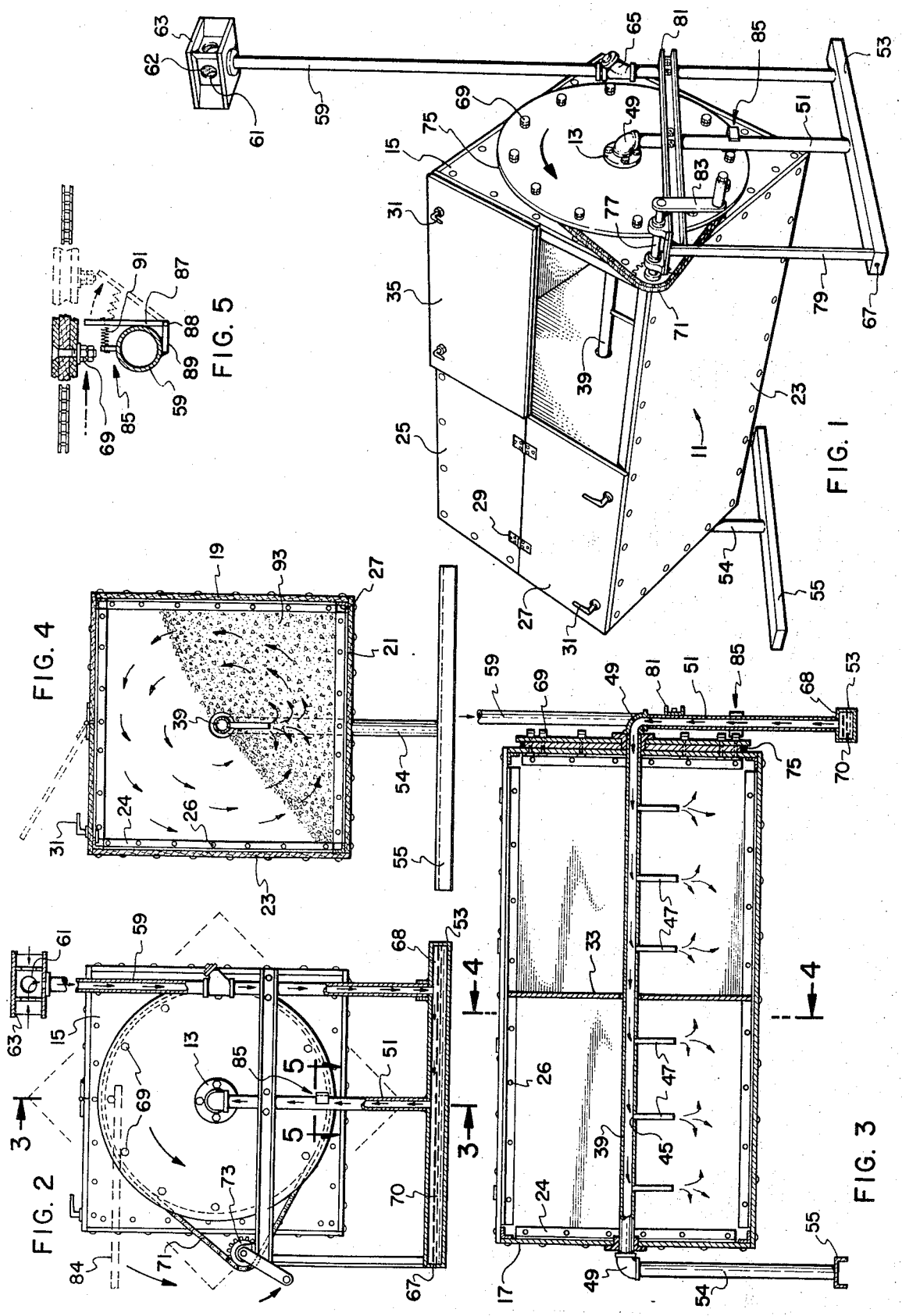

3,837,810

COMPOSTER

BACKGROUND OF THE INVENTION

1. Field of the Invention:

This invention relates generally to an inexpensive apparatus for converting organic waste materials into compost, and more particularly to a composting apparatus in which an optimum balance of air and moisture is continually made available to the organic wastes during the composting action by a simple and non-power consuming means.

2. State of the Art:

Composting is nature's way of recycling organic wastes whereby waste vegetable materials are converted into humus-type products (compost) by aerobic decomposition. The compost may then be returned to the soil as a nutritive additive. Various composting processes are known. The simplest is a batch composting process whereby vegetable wastes such as leaves, manure, grass, clippings, etc. are deposited in a pile and allowed to decompose over a period of several months.

As waste problems increased, more sophisticated composting apparatuses and processes were proposed in response to the need for transforming large quantities of sewage sludge and/or industrial organic wastes into fertilizer.

Rotating, cylindrical composters with means for mixing organic wastes in the presence of air and moisture were proposed. Examples of such composters are shown in U.S. Pat. Nos. 2,241,734, 3,054,663 and 3,041,148. In the last listed patent the cylindrical container is divided into a plurality of elongated hexagonal compartments to provide a type of continuous batch process.

Composting apparatuses, such as those just referred to, are relatively complicated and costly and generally require skilled operators to achieve maximum composting efficiency; hence, such composting apparatuses are not suitable to, nor satisfy the needs of, homeowners who desire a composter for handling wastes accumulated during maintenance of a small homestead with its gardens, yards, lawns, etc.

OBJECTS OF THE INVENTION

It is an object of this invention to provide a composter which is not only simple in construction, but simple in operation, yet capable of producing a high-quality compost.

Another object is to provide a composter capable of producing and maintaining an optimal composting environment.

Still another object is to provide a composter which can be assembled and used by homeowners, and yet not require special training to obtain a high-quality compost within a short period of time.

SUMMARY OF THE INVENTION

The composter of this invention comprises a rotatable square, or rectangular, container having sides made of a heat insulating-type material capable of holding in the biochemically produced heat rather than dissipating it to the outer atmosphere as normally occurs with most metal composters. The container is mounted for rotation about its longitudinal axis on a support means. Both the container and support means are uncomplicated in design and of simple inexpensive construction.

In one embodiment the support means is adapted to deliver moisturized air continuously to the compost. In this embodiment, a water-holding manifold functions as a base for the composter support means, which, in turn, is connected through a vertical conduit to a horizontally disposed perforated pipe about which the container rotates. The water vapor is carried into the container by air which enters the manifold from an upstanding pipe extending from the manifold to a point above the container. The upper end of the pipe is provided with an intake housing adapted with outside collecting wings and curtain check valves. This arrangement collects and directs the air downward through the pipe and into the manifold. A belt or chain may be trained over a sprocket mounted on one end of the container for selectively rotating it and thereby creating a tumbling action of the composting materials within the container.

BRIEF DESCRIPTION OF THE DRAWINGS

The present invention may be further understood by referring to the following description and appended drawings which are offered by way of illustration only and not in limitation of the invention whose scope is defined by the appended claims.

In the drawings:

FIG. 1 is a pictorial view of a composting apparatus according to the invention;

FIG. 2 is an end view of the apparatus of FIG. 1 with portions cut away;

FIG. 3 is a longitudinal cross-sectional view along line 3—3 of FIG. 2;

FIG. 4 is a cross-sectional view along line 4—4 of FIG. 3; and

FIG. 5 is an enlarged detail view of the ratchet assembly of the apparatus of FIG. 1.

DESCRIPTION OF THE PREFERRED EMBODIMENT

The composting apparatus illustrated in FIGS. 1 through 4 includes an elongated rectangular or square container 11 which is horizontally disposed and mounted for rotation on plastic flange bearing members 13. The container 11 may be fabricated from a semi-light but strong material having heat insulating characteristics. A material such as high density plywood has been found to be very satisfactory.

The use of a rectangular or square container in which its interior walls are capable of retarding heat conduction to the outside atmosphere are important features of this invention. This combination of design features results in a container capable of tumbling its contents far more efficiently than that possible with the usual cylindrical metal wall containers which lack the heat insulating characteristics of wood and/or other similar inexpensive construction materials. Poor tumbling occurs in metal cylindrical containers because of the presence of liquid or moisture which functions as a lubricant between the smooth inner walls of the cylindrical container and its contents. As the metal cylinder is rotated, the contents within the cylinder slide along its interior wall and little or no tumbling is achieved. This problem is overcome in the present invention by using straight plane box walls rather than curved, smooth inner walls.

In addition, the plane box walls do not require specially designed lifters (as are needed in most cylindrical metal composter drums), to obtain the degree of mixing and tumbling action which is so important in composting.

In addition, the plywood inner walls form an excellent heat insulating barrier, as well as a convenient means of preventing excessive losses of moisture. This maintains a favorable humidity and temperature atmosphere within the container for aerobic bacterial composting activity. Proper temperature and constant humidity are parameters which are most critical for the conversion of organic wastes into useable compost.

More specifically, the container 11 has opposed, preferably square end walls 15 and 17 and three flat sidewalls 19, 21 and 23. The sidewalls are fastened to the endwalls by angle irons 24 in combination with nuts and bolts 26. Preferably, the fastenings are such that small or narrow spaces 27 are left between the sidewalls to permit drainage of excess liquid (if any is accumulated) and/or venting of spent air and/or gases produced during the composting operation. The fourth sidewall is longitudinally divided in half with one-half 25 fixed to the container and the other half 27 hinged to the first half 25 to function as a door for gaining entrance inside the container. Conventional hinges 29 and latches or locks 31 are also provided.

In the illustrated embodiment, the container 11 is sectioned into two compartments by an interior transverse wall 33. In this case the door is transversely sectioned so that each compartment has a hinged door 35 and 27 which can be separately opened and closed. A pipe 39 extends axially through the container 11 with its ends circumscribed with flanges or bearing members so that the container can be freely rotated thereabout.

That portion of the pipe which is within the container has plurality of axially and circumferentially spaced threaded perforations 45 formed therethrough. Short threaded pipes 47 fit into the perforations and extend radially from the pipe. Each end of the pipe 39 extending through the container is adapted with a 90 degree elbow 49 to which is connected a downwardly extending vertical pipe 51 and 54. The lower end of vertical pipe 51 is perpendicularly connected to a water manifold 53 which lies in a direction which is perpendicular to the longitudinal axis of the container. The other vertical pipe 54 is connected to a horizontal member 55 which is positioned parallel to the manifold. The horizontal member 55, the manifold 53, the two vertical pipes 51 and 54 and the transverse pipe 39 complete a base for supporting the container for rotation along its longitudinal axis. A second vertical upstanding pipe 59, in communication with the manifold 53, extends upwardly to an inlet air housing 63 which covers four directional air inlets 61, each provided with an interior curtain check valve 62. A tap plug 65 is provided on the upstanding pipe 59 for introducing water into the manifold. An overflow hole 67 is provided about midway in the manifold to maintain a maximum liquid level and to provide a freeboard space 68 the liquid 70 in the manifold.

Means are also provided to selectively rotate the container. In one embodiment an endless belt or chain 71 is trained over a sprocket 73 and then over a pulley 75 spaced from the drum. In another embodiment (not shown), studs or bolts such as those shown in the drawings as 69 protrude from one side of the container in a circular pattern. The ends of a roller chain or a rubber belt are fixed to two of these bolts and the chain is then trained back over the other bolts and then over a sprocket spaced from the drum. In either embodiment the sprocket axle 77 is positioned or braced by support members 79 and 81. A crank 83 is provided to turn the sprocket upon manual rotation. If desired, the crank can be replaced with an electric gear motor having a reduced speed. As a third alternative, which uses no chains, belts or sprockets, the drum may be rotated by means of a bar 84 placed between two consecutive bolts 69 and force exerted as shown in FIG. 2.

A ratchet mechanism generally designated 85 in FIG. 5 is provided to selectively stop rotation of the box at preselected angular positions. The ratchet mechanism may comprise a strong metal arm 87 which is pivotally fixed 88 to a second metal arm 89 which in turn is fastened to the upright pipe 51. The metal arm 87 extends inward beyond pipe 51 to be struck and pivotally moved by an adjacent bolt 69 on the revolving box end. The ratchet mechanism includes a biasing spring 91, which returns the hinged arm 87 to its original position and prevents any unwanted counter rotation of the composting container.

In operation, one compartment in the container may be partially filled with moistened organic waste 93 comprising leaves, cut grass, manure, etc., or a mixture of same. To provide a continuous supply of moisture to the organic wastes being composted, the tap plug 65 on the vertical pipe 59 is removed and water introduced therein. The water moves down pipe 59 and into the manifold 53 until it is approximately one-half filled as determined by the overflow opening 67. The manifold thus forms a water reservoir external to the main composting container. As shown in FIG. 2 by arrows, air flows downward from the extended vertical pipe into the freeboard space 68 of the manifold. As the air passes through the freeboard space, it absorbs moisture and carries it from the manifold into the main composting container via the perforated axial pipe 39. Some of the excess water introduced into the container or moisture produced during the composting action is absorbed by the container's inner wall. The remaining excess water is removed through spaces or openings 27 in the container. Normally, the water and oxygen demands for composting are fulfilled by the above sequence, which thereby provides a relatively simple means for maintaining ideal composting conditions.

Another important aspect of the invention is that agitation or tumbling of the waste material is readily accomplished with a minimum number of container rotations. As opposed to known cylindrical composters without interior lugs or lifters, wherein the compost tends to slide along the non-changing interior slope of the cylinder during rotation, the inside slope of the surface of the box-like container of this invention changes from horizontal to vertical four times during each revolution of the box. This causes a definite tumbling action of the contents which is conducive to efficient aeration of the material being composted. In fact, this design assures complete inversion of the contents during each complete or partial revolution of the composter. With the square box type container it was found that effective mixing of the organic wastes occurs without providing any interior lifters or lugs. In practice, it was found that the container need not be rotated through a complete revolution to achieve adequate tumbling and aeration of its contents. Accordingly, the means for rotating the composter may provide somewhat less than 360 degree rotation, and still operate effectively. The container can be selectively stopped in any number of angular positions by the ratchet means. In practice, the organic wastes may be turned daily, but normally only two or three times a week has been found to be satisfactory. The purpose of this turning is to expose the organic wastes to moist air and thereby provide the environment necessary for optimum aerobic bacterial action during composting.

We claim:

1. An apparatus for converting organic waste materials into compost comprising:
   a. substantially square or rectangular vertically partitioned, nonmetallic, heat insulated container for holding organic wastes;
   b. entrance means for introducing organic wastes into each partition or compartment of said container;
   c. means for supporting said container along its longitudinal axis, said means including a perforated pipe which extends axially through said container and about which said container can be rotated the perforations of said perforated pipe being directed downwardly within the compartments;
   d. means for introducing air and moisture into said container through said perforated pipe including a water holding manifold and an upstanding air conduit in communication therewith, said upstanding air conduit having mounted thereon at or near its top a housing adapted with an interior, curtaintype check valve for permitting air to enter said housing, said introducing means also including a second upstanding conduit communicating from the water holding manifold to the axially extending perforated pipe, whereby the moisturized air is directed to said perforated pipe, and directing said air into each compartment of said container via said upstanding air conduit, said water holding manifold, said second upstanding conduit, and said perforated pipe; and
   e. means for rotating said container.

2. The apparatus of claim 1 wherein said water holding manifold concomitantly functions as part of a base for said supporting means.

3. The apparatus of claim 1 wherein the means for rotating said container includes a means for selectively holding said container in a preselected position after rotation.

4. The apparatus of claim 3 wherein the upstanding air conduit includes a covered opening through which water may be introduced into said water holding manifold.

5. The apparatus of claim 4 wherein said means for rotating said container includes a chain trained about a sprocket mounted to one side of said container and a means for rotating said sprocket.

* * * * *